United States Patent [19]

Lavins et al.

[11] Patent Number: 4,481,398
[45] Date of Patent: Nov. 6, 1984

[54] MULTI-DIRECTIONAL OSCILLATING BREAKOFF MECHANISM FOR SEPARATING BILLETS

[76] Inventors: Paul N. Lavins, 338 Moran, Grosse Pt. Farms, Mich. 48236; Thomas R. Bogan, 14614 Hillsdale, Sterling Heights, Mich. 48078

[21] Appl. No.: 417,284

[22] Filed: Sep. 13, 1982

[51] Int. Cl.³ .............................................. H05B 6/10
[52] U.S. Cl. .................................. 219/10.69; 219/10.57; 219/10.67; 219/388; 414/210; 414/211; 432/121; 432/122; 225/98; 198/784; 193/37
[58] Field of Search ............... 219/10.69, 10.71, 10.67, 219/10.57, 388; 414/210, 211; 198/461, 784; 193/37; 432/122, 121, 123, 124, 58; 225/98, 99

[56] References Cited

U.S. PATENT DOCUMENTS

| | | | |
|---|---|---|---|
| 2,911,510 | 11/1959 | McNulty | 219/10.69 |
| 3,257,055 | 6/1966 | Arnott | 225/99 X |
| 3,637,063 | 1/1972 | Ward | 193/37 X |
| 3,830,355 | 8/1974 | Verjux | 198/461 |

Primary Examiner—P. H. Leung
Attorney, Agent, or Firm—Krass & Young

[57] ABSTRACT

A conveyor for removing billets from an induction heating furnace and for separating them from following billets to which they may have become adhered employs a roller having a contoured surface. The roller is rotatably mounted about an axis skewed relative to its central axis so that it wobbles as it rotates, imparting a reciprocating force on the billet to separate it from the following billet to which it is adhered.

8 Claims, 4 Drawing Figures

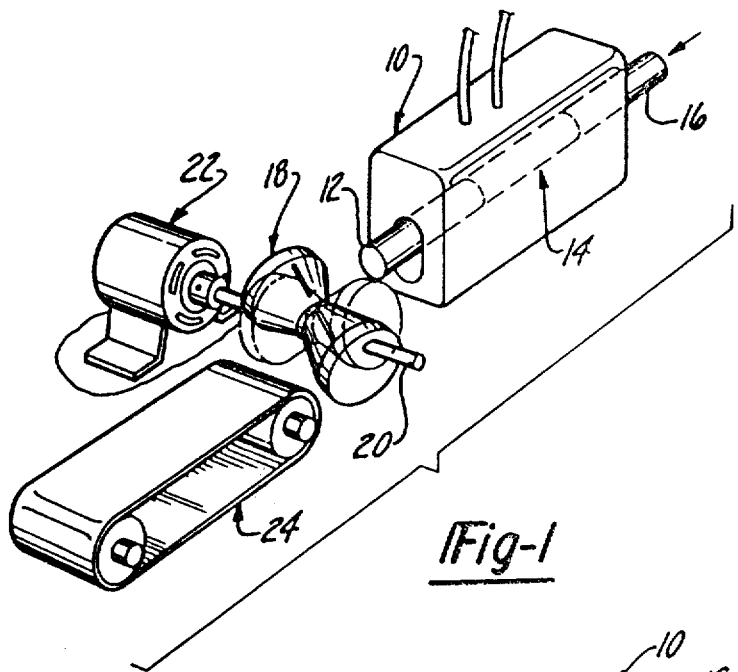
Fig-1
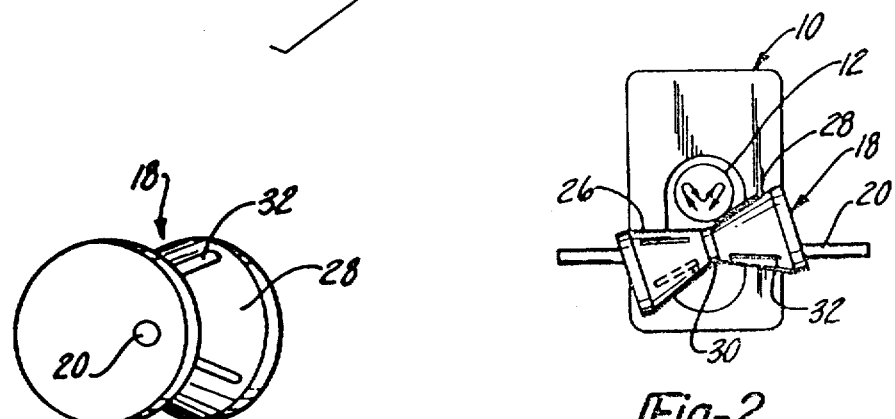
Fig-2
Fig-3
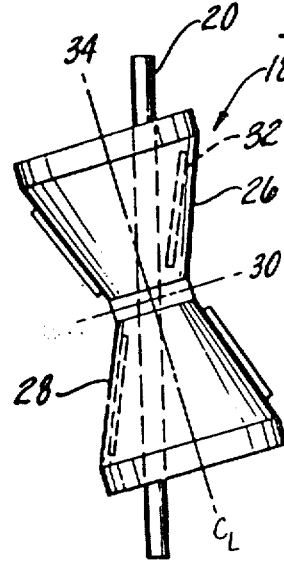
Fig-4

MULTI-DIRECTIONAL OSCILLATING BREAKOFF MECHANISM FOR SEPARATING BILLETS

TECHNICAL FIELD

This invention relates to heating systems and, more particularly, to induction heating systems for sequentially heating a series of metal billets.

BACKGROUND ART

Induction heating of elongated metal billets is well known in the art. In a typical installation, a plurality of billets are fed in an end-to-end relationship through an induction heater assembly. The billets often become so hot during heating that incipient melting occurs. The flow of molten metal, known as scale, frequently contacts the surface of the adjacent, following billet causing adhesion between the two billets. As the first heated billet is removed from the heater, the following billet may stick to it resulting in incomplete heating of the second billet due to its shortened residency time within the heater. In some instances, this necessitates a repetition of the heating process for the following billet.

Although several methods of solving this problem have been introduced, they have either proven unsuccessful or economically prohibitive. One technique utilized a roller adjacent the exit of the heater provided with a bumpy surface. Another technique employed a cylindrical roller rotated about an eccentric axis parallel to the longitudinal axis of the roller. These techniques provided only limited movement of the removed billet in a vertical direction and did not provide satisfactory results. The failures of these techniques led those skilled in the art to a relatively costly and messy method of preparing the billets with a glaze prior to heating in an attempt to prevent adhesion resulting from the scale created during the heating process.

The present invention is directed towards an effective and inexpensive means for removing and separating billets in order to increase production efficiency in induction heating processes.

This invention digresses from the current trend of the skilled practitioner attempting to solve this problem and returns back to the general concept of using a roller to separate the billets. However, the roller surface is shaped and rotated in such a manner that it wobbles to provide radial forces on the end of the removed billet in a multitude of orbital directions, not just up and down. This technique has provided excellent results for separating the billets and may be employed at comparatively low cost. In the preferred embodiment, the roller is rotated about an axis skewed relative to the major longitudinal axis of the roller. Preferably, the roller surface is defined by a surface of revolution provided by a curve defined by two converging lines meeting at a trough. This provides the roller with a generally "hour glass" shape with two ramp surfaces alternatingly providing progressively increasing components of sideways motion to the end of the billet. In addition, the surface of the roller may be provided with protruberances spaced thereon providing intermittent spurts of exaggerated motion to the billet.

BRIEF DESCRIPTION OF THE DRAWINGS

Various advantages of the present invention will become apparent to one skilled in the art upon reading the following specification and by reference to the drawings in which:

FIG. 1 is a perspective view of an induction heating system employing the teachings of the present invention;

FIG. 2 is a side view taken from one side of the roller looking back into the heater unit;

FIG. 3 is an end view of the roller as viewed from its axis of rotation; and

FIG. 4 is a top view of the roller.

DESCRIPTION OF THE PREFERRED EMBODIMENT

Referring now to the drawings, FIG. 1 illustrates in simplified form a magnetic induction heating system employing the teachings of the preferred embodiment of this invention. An induction heater unit 10 is utilized to inductively heat a plurality of elongated billets which are progressively fed through heater 10 in an end-to-end relationship. In FIG. 1 there are three billets 12, 14 and 16 shown in various stages of transport through heater 10. Various designs may be employed for the heating and transportation of the billets. One acceptable construction is the use of skid rails for guiding the billets through the cavity of heater 10 having a coil surrounding a ceramic cylinder (not shown). Suitable mechanisms are employed to push the billets progressively through the heater 10.

Roller 18 is positioned adjacent the exit of heater 10 in the manner shown most clearly in FIG. 2. Roller 18 is rotated about an axle 20 driven by a suitable power source such as motor 22. The rotation of the outer surface of roller 18 contacts the end of the exiting billet 12 and carries it forward to remove it from heater 10. After passing over roller 18 the billet is deposited on a suitable conveyor 24 for transporting it to another processing stage, such as a forging unit for operating on the heated billets.

Special attention should now be drawn to roller 18 as shown in detail in FIGS. 2-4. Roller 18, preferably made of machined steel, is generally hour glass shaped. The outer surface of roller 18 is defined by a surface of revolution provided by a generally V-shaped curve. Roller 18 can be envisioned as two mutually converging truncated cones 26 and 28 joined together by a hand 30 extending normal to the major longitudinal axis 34 of the roller 18. The axel 20 for rotating roller 18 is skewed with respect to the axis 34, preferably at an angle of about 12°. It should be noted however, that this angle can be varied without departing from the spirit of the invention so long as rotating roller 18 imparts sufficient varying horizontal and vertical forces to break the adhesions on the exiting and adjoining billets.

As can be seen most clearly in FIG. 2, axle 20 is disposed normally to the elongate axis of the billets exiting heater 10. The middle or band 30 is disposed immediately below the vertical center line of billet 12.

In operation, axle 20 is rotated at a speed somewhat faster than the usual exiting speed of the billets. As the roller 18 is rotated it wobbles. When the end of the billet 12 comes into contact with roller 18, the roller surface exerts varying degress of orbital motion to the billet as is shown diagrammatically by the arrow in FIG. 2. The cone shaped surfaces 26, 28 of the wobbling roller 18 provide alternate camming action to the billet imparting forces having both a vertical and horizontal component. The magnitude and direction of the force component will vary as the angle of inclination of the roller surface changes due to its skewed arrangement on axle 20. This wobbling action, creating orbital motion in the billet in all directions, is sufficient to break any adhesion to the following billet that may be created by the aforementioned scale.

To further exaggerate the motion imparted by roller 18 to the billet, a series of elongated protruberances or ridges 32 may be formed in the surface of the roller. Ridges 32 provide intermittent spurts of additional motion to the billet serving to further aid in the separation process.

From the foregoing, those skilled in the art will appreciate that the present invention provides a simple, yet effective method of solving a long standing problem that has plagued the industry. Various modifications to the particular example disclosed will become apparent after a study of the specification, drawings and claims.

We claim:

1. In a system for heating elongated billets passing through a heater unit in an end-to-end relationship and exiting therefrom, the improvement comprising:
   a roller adjacent the exit of the heater unit and mounted for rotation about an axle extending normal to the path of travel of the billets exiting the heater; means for rotating said roller; and
   means for presenting asymmetrical roller surface portions relative to the axle for contacting the exiting billet and moving the billet in an multi-directional pattern having varying horizontal and vertical components of motion transverse to the longitudinal axis of the billet as the roller rotates, whereby the motion of the exiting billet serves to separate it from adjacent billets in the heater.

2. The improvement of claim 1 wherein said means for presenting asymmetrical roller surface portions relative to the axle for contacting the exiting billet is a symmetrically shaped roller mounted upon an axle skewed relative to the major longitudinal axis of the roller.

3. The improvement of claim 2 wherein said roller is configured in the shape of two mutually converging cones joined at the middle of the roller, with the middle of the roller being positioned vertically beneath the vertical center line of the exiting billet.

4. The improvement of claim 3 wherein said axle is skewed relative to the major longitudinal axis of the roller by an angle of 12°.

5. The improvement of claim 4 wherein said roller further includes elongated ridges on its outer surface.

6. The improvement of claim 5 wherein said heater is an induction heater.

7. An induction heating system comprising:
   an induction heating unit for heating elongated billets passing therethrough in an end-to-end relationship and exiting through an opening in the heater unit;
   a roller in the form of an hour glass shaped member defined by two mutually converging cones joined at the middle of the roller;
   an axle extending through the roller at a skewed angle relative to the longitudinal axis of the roller, said axle being positioned normal to the path of travel of the exiting billets and supporting said roller so that the middle thereof lies beneath the vertical center line of the billets; and
   means for rotating the axle whereby said roller produces motion to the exiting billet to aid in separating it from adjacent billets in the heater.

8. The system of claim 7 wherein said roller includes elongated ridges on its outer surface.

* * * * *